United States Patent [19]
Biernacki

[11] Patent Number: 5,976,599
[45] Date of Patent: Nov. 2, 1999

[54] APPARATUS AND METHOD FOR MAKING DOUGH ROLL

[75] Inventor: Frank R. Biernacki, Mokena, Ill.

[73] Assignee: Campagna Turano Bakeries, Inc., Berwyn, Ill.

[21] Appl. No.: 09/040,019

[22] Filed: Mar. 17, 1998

[51] Int. Cl.⁶ .................................. A21D 6/00; A23P 1/00
[52] U.S. Cl. ......................... 426/496; 99/426; 425/261; 425/356; 426/512
[58] Field of Search ...................................... 426/496, 502, 426/512; 425/356, 261, 453; 99/426

[56] References Cited

U.S. PATENT DOCUMENTS 4,702,926  10/1987  Fowler ...................................... 426/512
5,591,470   1/1997  Bartley ...................................... 426/496

*Primary Examiner*—George Yeung
*Attorney, Agent, or Firm*—Dick and Harris

[57] ABSTRACT

An apparatus for the preparation of bread dough rolls is provided. The apparatus includes a first press for spreading the bread dough blank across the top surface of the mold and forcing a portion of the bread dough blank at least partially into the at least two depressions; and a second press for further spreading the bread dough blank across the top surface of the mold and forcing a portion of the bread dough blank completely into the at least two depressions. This provides a bread dough roll which can have a cross-section of intentionally varying thickness.

21 Claims, 4 Drawing Sheets

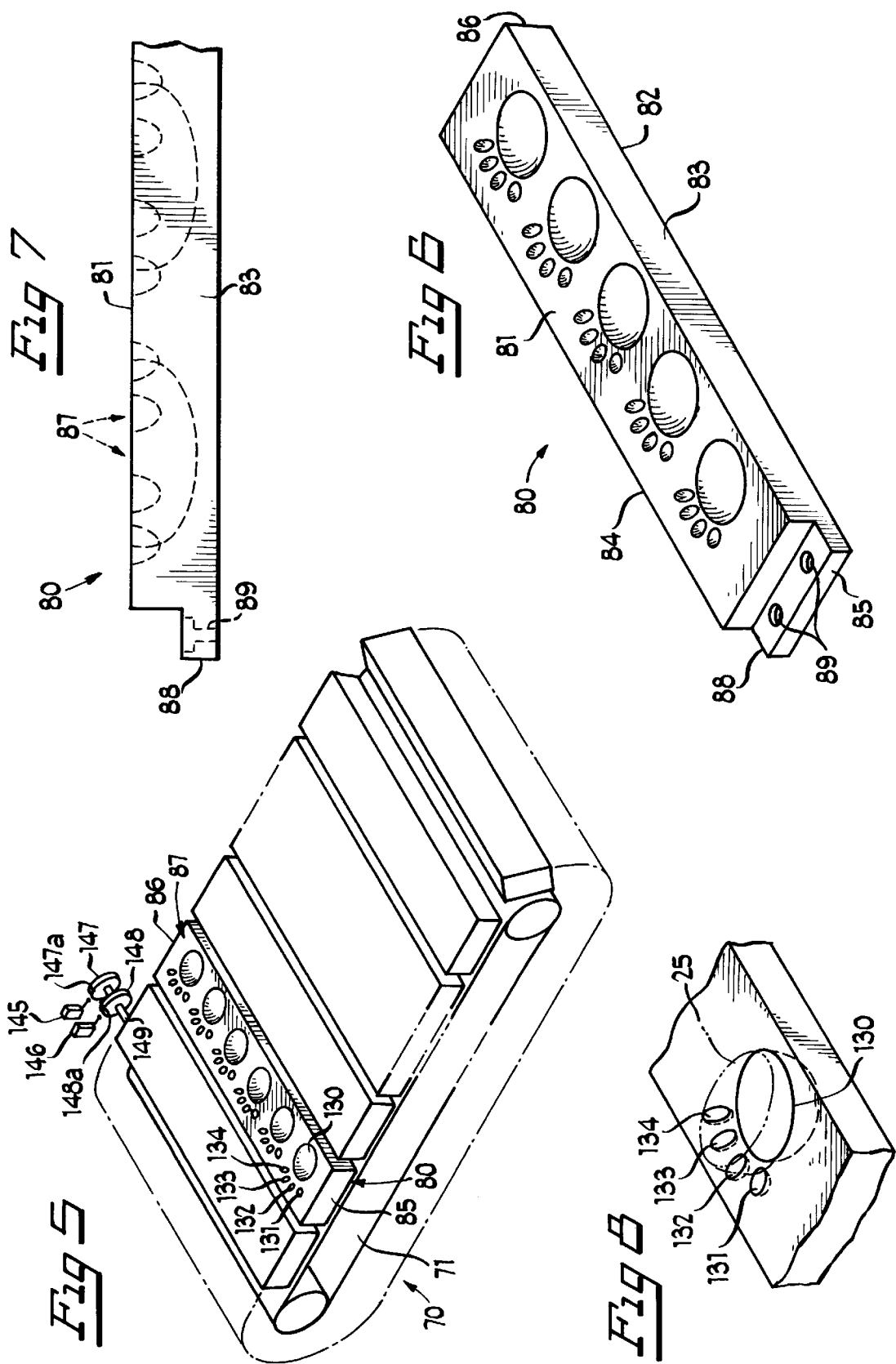

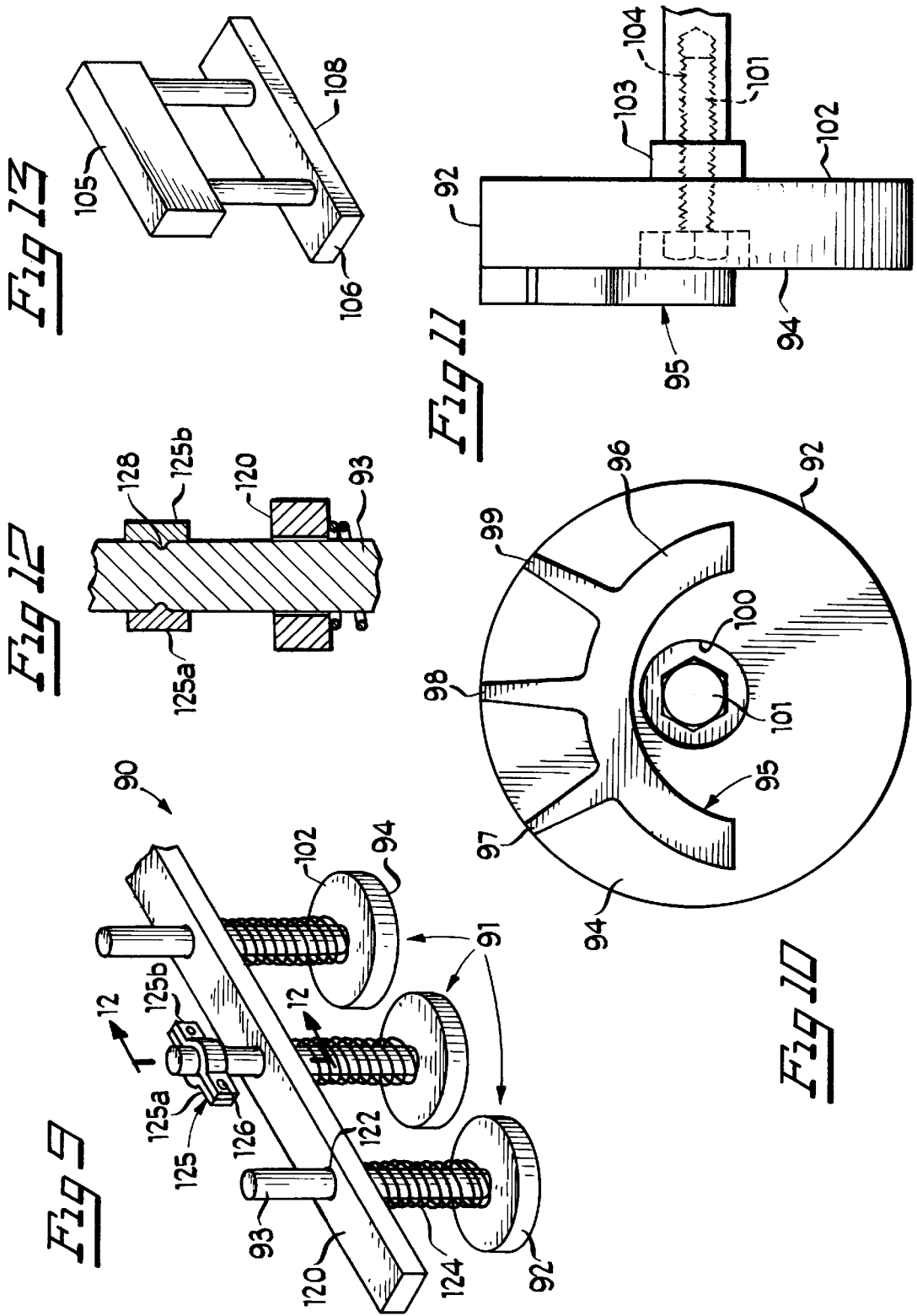

APPARATUS AND METHOD FOR MAKING DOUGH ROLL

BACKGROUND OF THE INVENTION

1. The Technical Field

The invention relates generally to methods and apparatus used for preparing bread dough rolls for baking. In particular, the invention relates to a method and apparatus for forming a bread dough roll of a desired, predetermined shape having a non-uniform cross section.

2. The Prior Art

It has long been practice in the baking industry to prepare bread dough rolls having a variety of shapes, such as round, square, oblong, and the like. Bread dough rolls are typically of substantially uniform cross-section, although the cross-section of a finished roll may be expected to be somewhat non-uniform as a result of uneven rising through the baking process.

It is possible to purposefully prepare bread dough rolls having substantially nonuniform cross-section. It may be desired to do so in order to, for example, produce a bread dough roll having a novel or decorative shape. In the past, preparing a bread dough roll having a desired, predetermined, novel or decorative shape and a nonuniform cross-section required a significant amount of human labor, thus making it commercially impractical to produce such bread dough rolls on a volume basis.

Accordingly, it is an object of the invention to provide a substantially automated method for preparing bread dough rolls having desired, predetermined shape and a non-uniform cross-section that requires a minimum of human intervention and labor.

It is a further object of the invention to provide an apparatus which substantially automatically prepares bread dough rolls having desired, predetermined shape and a non-uniform cross-section with a minimum of human intervention and labor.

SUMMARY OF THE INVENTION

The present invention comprises in part, an apparatus for forming pre-formed bread dough blanks of substantially uniform thickness into bread dough rolls having a predetermined shape.

A mold is provided, having at least a top surface, the top surface being configured to define at least two depressions. Means are provided for placing a pre-formed bread dough blank onto the mold in a predetermined orientation relative to the at least two depressions. A first press spreads the bread dough blank across the top surface of the mold and forces a portion of the bread dough blank at least partially into the at least two depressions. The mold is then advanced from the placing means to a predetermined position. A second press further spreads the bread dough blank across the top surface of the mold and forces a portion of the bread dough blank completely into the at least two depressions.

Second means advance the mold from the predetermined position to a second predetermined position. Thereafter, the bread dough blank is released from the mold.

The mold preferably comprises a top surface configured to define a substantially circular depression and four substantially oblong depressions. In particular, the mold has a top surface configured to define a substantially circular depression and four substantially oblong depressions, the four substantially oblong depressions being substantially symmetrically arranged about a portion of the perimeter of the substantially circular depression.

The means to place a pre-formed bread dough blank onto the mold in a predetermined orientation relative to the at least two depressions is automated. The predetermined orientation relative to the at least two depressions is such that the bread dough blank overlies a portion of the at least two depressions and a portion of the top surface of the mold between the at least two depressions.

Preferably, the first press is configured to divide the bread dough into at least two regions, the at least two regions corresponding to the at least two depressions, upon impacting the bread dough blank.

A preferred embodiment of the invention also comprises means to actuate the first press and means to actuate the second press, which preferably are automated. The actuation means are preferably operably associated with the first and second means for advancing the mold.

The first means for advancing the mold and the second means for advancing the mold preferably comprise a conveyor system.

The means for releasing the bread dough blank from the mold comprises means for tipping the mold towards an inverted position.

The invention also comprises a process for forming pre-formed bread dough blanks of substantially uniform thickness into bread dough rolls having a predetermined shape, the process comprising the steps of:

providing a mold comprising a top surface configured to define at least two depressions;

placing a pre-formed bread dough blank onto the mold in a predetermined orientation relative to the at least two depressions;

advancing the mold to a position wherein the mold and the bread dough blank are in a desired, predetermined orientation relative to a first press;

actuating the first press to impact the bread dough blank so as to spread the bread dough blank across the top surface of the mold and force the bread dough blank at least partially into the at least two depressions;

advancing the mold to a position wherein the mold and the bread dough blank are in a desired, predetermined orientation relative to a second press;

actuating the second press to impact the bread dough blank so as to further spread the bread dough blank across the top surface of the mold and force the bread dough blank completely into the at least two depressions; and releasing the formed bread dough blank from the mold.

The process further comprises the step of placing a pre-formed bread dough blank onto the mold such that the bread dough blank overlies a portion of the at least two depressions and a portion of the top surface of the mold between the at least two depressions.

Preferably, the steps of advancing the mold are carried out by automated means.

BRIEF DESCRIPTION OF THE DRAWINGS

FIG. 5 is a perspective view of a tray conveyor.

FIG. 6 is a perspective view of a mold tray.

FIG. 7 is a partial side elevation view of a mold tray.

FIG. 8 is a perspective view of a forming region of a mold tray.

FIG. 9 is a perspective view of a plurality of first presses.

FIG. 10 is a bottom plan view of a press head.

FIG. 11 is a side elevation view of a press head.

FIG. 12 is a sectional view of a press shaft and shaft collar, taken generally along line 12—12 of FIG. 9.

FIG. 13 is a perspective view of a second press.

BEST MODE FOR PRACTICING THE INVENTION

While this invention is susceptible of embodiment in many different forms, this disclosure and the referenced drawings describe a particular embodiment in detail. This disclosure shall be considered only to provide an example of the principles of the invention. It is not intended to limit the invention to the illustrated embodiment.

Figure 1:
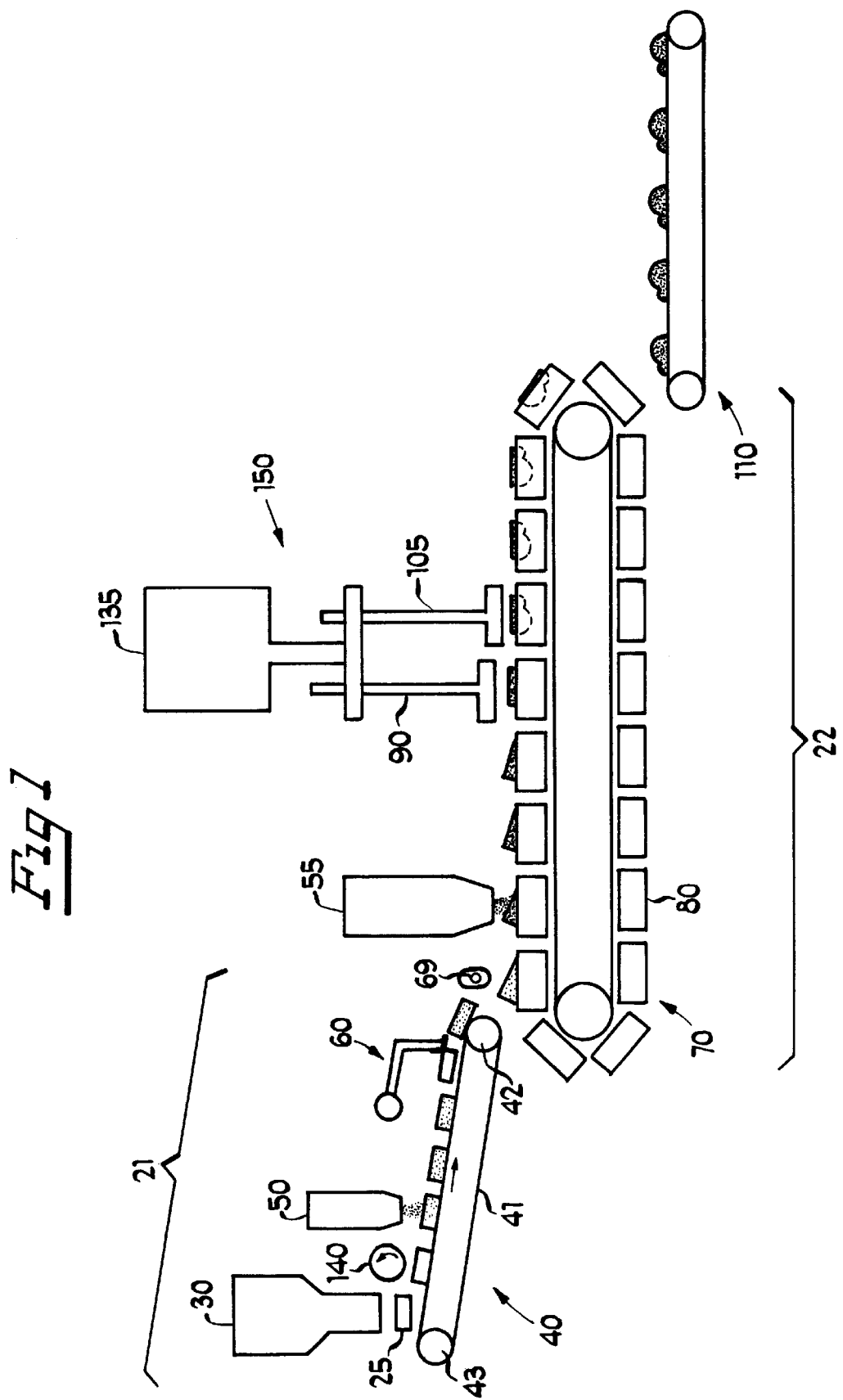
FIG. 1 is a schematic representation of an apparatus comprising an embodiment of the invention.

FIG. 1 schematically illustrates an apparatus for forming a three-dimensional bread dough roll according to a preferred embodiment of the invention. The apparatus comprises two main sections, a roll makeup section 21 and a stamping section 22.

Roll makeup section 21 comprises dough dispenser 30, dough roller 140, dough conveyor 40, first flour duster 50, and arrangement tool 60. Roller 140, in particular, is a powered roller (roll direction indicated by arrow), which is sized and propelled at such a velocity, that its surface, which comes into contact with the dough lumps, moves at the same speed as the conveyor 40, so that the lumps, which are generally circular prior to rolling, retain their circular shape after rolling, without elongation or spreading. The diameter, rotational speed, and placement above the conveyor will depend upon the size of the lumps and the desired size after rolling, and may be readily determined, by one of ordinary skill in the art, having the present disclosure before them, using conventional engineering principles. Dough dispenser 30 is contemplated to be of known design, such as a unit produced by Werner Phleider. Dough roller 140 is also contemplated to be of known design, such as a unit produced by Oshikiri. First flour duster 50 is also contemplated to be of conventional design as may be found in a typical commercial bakery. It is contemplated that the dusting rate of first flour duster 50 may be adjustable, and that the optimum dusting rate may be readily determined by one skilled in the art. It is further contemplated that the dusting rate may be controlled remotely by a conventional, programmable control unit (not shown).

Dough dispenser 30 is contemplated to dispense bread, or other, dough blanks 25 of a desired, predetermined shape. In a preferred embodiment, dough dispenser 30 is configured to dispense substantially circular bread dough blanks of substantially uniform thickness. Dough dispenser may be controlled by a conventional, programmable control unit (not shown).

Dough conveyor 40 is contemplated to be of conventional design, comprising a conveyor belt 41, a plurality of rollers 42 and 43, a conventional drive mechanism (not shown), and a control unit (not shown) for controlling the operation of the conveyor. The drive mechanism may be of any suitable conventional design, such as a motor and pulley system or a direct-coupled electric motor, for example. The control unit may be any conventional, programmable control unit.

Figure 2:
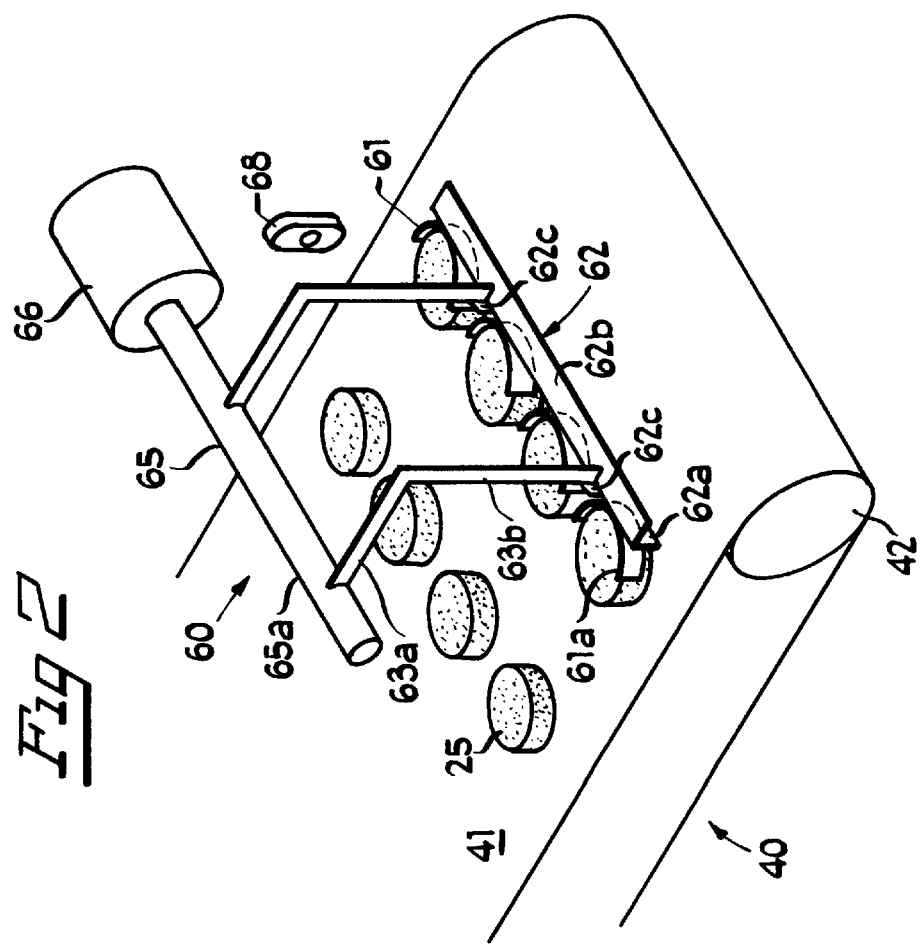
FIG. 2 is a perspective view of an arrangement tool associated with a dough conveyor.

As illustrated in FIG. 2, arrangement tool 60 may be comprised of at least one arrangement member 61, bracket 62, at least one support arm 63, pivot member 65, toggling mechanism 66, and toggling mechanism control unit (not shown), including proximity sensor 68.

In a preferred embodiment, arrangement members 61 are arcuate members having concave surfaces 61a which face the upstream direction of conveyor 40. Arrangement members 61 may be of other shapes as well, preferably configured to complement the shapes of the bread dough blanks 25 dispensed by dough dispenser 30. The number of arrangement members 61 used in any particular application is primarily a function of the size and shape of the bread dough blanks 25 and the width of the dough conveyor 40.

Arrangement members 61 may be made of any suitable material, such as a plastic or a metal suitable for food service use. It is preferable that arrangement members 61 be made of a material which is inherently resistant to sticking to bread dough. Alternatively, arrangement members may be coated with a non-stick material such as that sold by du Pont under the trademark TEFLON®.

Bracket 62 is illustrated as an elongated, L-shaped bracket having two substantially perpendicular elements 62a and 62b, and two attachment tabs 62c, although other configurations may be suitable, as well. Bracket 62 may be made of any suitable material, such as a plastic or a metal.

Support arms 63 are illustrated in FIG. 2 as comprising substantially perpendicular elements 63a and 63b, although other configurations may also be suitable. Support arms 63 may be made of any suitable material, such as a plastic or a metal. Support arms 63 may be monolithically formed units, or they may be fabricated by joining distinct elements by mechanical or chemical means, for example.

Arrangement members 61 are contemplated to be attached to element bracket 62 by conventional means, such as welding, chemical bonding, or by the use of conventional mechanical fasteners. One end of support arms 63 is contemplated to be attached to attachment tab 62c of bracket 62 using conventional mechanical fasteners, although it may be attached by other suitable means, as well.

Pivot member 65 is shown as an elongated, cylindrical member having a peripheral surface 65a. Pivot member 65 may be made of any suitable material, such as a suitable plastic or metal. The end of support arm 63 which is not attached to bracket 62 may be attached to peripheral surface 65a of pivot member 65 by any suitable method.

Toggling mechanism 66, which is contemplated to be operably associated with pivot member 65, may be any mechanism which can be used to effect a change of state of arrangement tool 61 between various positions. For example, toggling mechanism 66 may comprise a pneumatic piston/cylinder unit acting on an eccentric cam which is operably associated with pivot member 65. Toggling mechanism 66 is contemplated to be controlled by a conventional, programmable control unit (not shown), receiving input from proximity sensor 68. Proximity sensor 68 is contemplated to be a conventional device, such as a photoelectric sensor.

Stamping section 22, as illustrated in FIG. 1 comprises tray conveyor 70, second flour duster 55, a plurality of mold trays 80, dough stamper 150, and proximity sensor 69. As further illustrated in FIG. 5, stamping section 22 further comprises first proximity switch 145, second proximity switch 146, cam shaft 149, first cam wheel 147, and second cam wheel 148.

Second flour duster 55 is contemplated to be of conventional design, similar to the design of first flour duster 50.

Proximity sensor 69 is contemplated to be of conventional design, such as a photoelectric sensor. First and second proximity switches 145 and 146 are also contemplated to be of conventional design, such as commercially available limit switches for detecting the presence and/or relative location of an object or surface.

Tray conveyor 70 is contemplated to be a conventional two-chain conveyor mechanism, as may be found in various industrial applications. Tray conveyor 70 may be power driven by any suitable, conventional means, such as a motor and pulley system or a direct-coupled electric motor, for example. A conventional, programmable control unit (not shown) may be provided to control the operation of tray conveyor 70.

Cam shaft 149, first cam wheel 147, and second cam wheel 148, as illustrated in FIG. 5, are operably associated with, and indexed to, the drive mechanism for conveyor 70, such that a particular degree of rotation of the cam shaft and each of the two cam wheels is proportional to a particular degree of translation of mold tray 80. Each of cam wheels 147 and 148 includes at least one trigger 147a and 148a, respectively, which is operably associated with, and configured for selective engagement with, each of proximity switches, 145 and 146, respectively.

Referring to FIGS. 6 and 7, mold trays 80 are substantially rectangular, having at least a top surface 81, a bottom 82, two sides 83 and 84, two ends 85 and 86, and at least one form region 87. Mold trays 80 are configured to permit secure attachment to tray conveyor mechanism 71. In a preferred embodiment, tabs 88, defining through-holes 89, protrude longitudinally from ends 85 and 86 of mold tray 80. Threaded fasteners may be inserted through through-holes 89 to attach mold tray 80 to mating holes in tray conveyor mechanism 71.

Each mold tray 80 comprises at least one form region 87. In a preferred embodiment, each mold tray 80 has a plurality of form regions 87. The number of form regions 87 associated with each mold tray 80 is a function of the width of the mold tray, the size of the form regions, and the spacing between form regions. The number and orientation of form regions 87 associated with each mold tray 80 corresponds to the number and orientation of arrangement members 61 associated with arrangement tool 60.

Each form region 87 is contemplated to have at least one distinct depression. In a preferred embodiment, as shown in FIG. 5, each form region 87 comprises a plurality of depressions. In this embodiment, each form region 87 comprises one relatively large, substantially circular concave depression 130 and four relatively small, substantially oblong concave depressions 131 through 134, each such substantially oblong depression having a longitudinal axis. The five depressions comprising each mold region 87 may be of substantially the same depth, or of differing depths. Each depression may be of substantially uniform or non-uniform cross section. Alternate embodiments having more or fewer depressions are also contemplated. Alternatively, form region 87 may further comprise at least one raised relief.

In a preferred embodiment, substantially oblong depressions 131 through 134 are arranged about substantially circular depression 130 in a fan shape, with their longitudinal axes passing through and extending radially away from the center of substantially circular depression 130, with approximately a 30 degree angle between the longitudinal axes of any two adjacent substantially oblong depressions 131 through 134. Substantially oblong depressions 131 through 134 are further oriented substantially symmetrically about a line which is parallel to ends 85 and 86 of mold tray 80, and which passes through the center of substantially circular depression 130 and between second and third substantially oblong depressions 132 and 133.

Mold tray 80 may be machined from a monolithic piece of aluminum. In alternate embodiments, mold tray 80 may be fabricated from any material suitable for use in a food service application and capable of withstanding repetitive impact service without becoming deformed or otherwise damaged. Possible alternatives include cast, forged, stamped, or machined aluminum or stainless steel, as well as molded plastic. In a preferred embodiment, at least a portion of mold tray 80 may be coated with a non-stick material, such as du Pont TEFLON®.

Dough stamper 150 is contemplated to be a substantially conventional bread roll stamping mechanism that may be found in a typical commercial bakery. One example of such a mechanism is that produced by Gemini of Philadelphia, Pa. Dough stamper 150 comprises at least one first press 90, at least one second press 105, and a reciprocation mechanism 135. The at least one second press 150 and the reciprocation mechanism 135 are contemplated to be substantially conventional, while the at least one first press 90 is unique to the invention. Typically, the mechanism of stamper 150 will be supported and propelled such that during the stamping process, the press heads are moved longitudinally, while the mold trays 80 are indexed, so that the stamping process actually takes place while the molds are in motion. Accordingly, while the presses are reciprocating up and down, the entire mechanism is being moved forward and backward, as the molds are being indexed.

Each first press 90 is comprised of a press head 92 having a working surface 91, and a shaft. Press head 92 and shaft 93 may be fabricated monolithically, or as distinct elements which may be subsequently connected by conventional means, such as welding or by the use of conventional mechanical fasteners, for example.

FIG. 10 shows a plan view of the working surface 94 of first press 90. Working surface 94 is substantially circular and flat, with the exception of raised relief 95. Raised relief 95 is comprised of a substantially arcuate section 96, with three substantially linear elements 97, 98, and 99 emanating from the arcuate section. Arcuate section 96 is substantially semi-circular, having a radius which is approximately two-thirds of the radius of press head 92. Arcuate section 96 is positioned eccentrically on working surface 94 of press head 92, being disposed towards the center of the press head.

Linear element 98 extends radially outward from the midpoint of the perimeter of arcuate section 96 to the perimeter of press head 92. Linear elements 97 and 99 are positioned substantially symmetrically on opposite sides of linear element 98 and extend radially outward from the outer perimeter of arcuate section 96 to the perimeter of press head 92. A substantially 30 degree angle is formed between each adjacent pair of linear elements 97 through 99.

Press head 92 may contain center bore 100. The center bore 100 is countersunk from the working surface 94 of press head 92, to accommodate the head of a threaded fastener, such as fastener 101. As shown in FIG. 11, the upper surface 102 of press head 92 may have an annular boss 103 with an inside diameter sized to slidingly receive shaft 93. Shaft 93 may be inserted into annular boss 103, and retained by means of threaded fastener 101 inserted through bore 100, from working surface 94, and threaded into mating internal threads 104 in the shaft.

Shaft 93 of first press 90 is operably associated with reciprocation mechanism 135 of dough stamper 150. In a preferred embodiment, each first press 90 is resiliently mounted to reciprocation mechanism 135 by means of press holder 120. Shaft 93 may be slidingly inserted through the center of a helical spring 124 and then slidingly inserted through a bore 122 in press holder 120. Press holder 120 thereby supports each first press 90 in a uniform, substantially perpendicular orientation relative to top surface 81 of mold trays 80. Spring 124 may be pre-compressed between press holder 120 and top surface 100 of press head 92. Shaft retainer 125 may then be removably attached to the portion of shaft 93 extending through and beyond bore 122. In this manner, press 91 is resiliently mounted on press holder 120.

Shaft retainer 125 may be comprised of two halves 125*a* and 125*b*, which may be connected together by means of threaded fasteners 126. Locking collar 125 may frictionally engage shaft 93 or may engage with a circumferential groove 128 in shaft 93 so as to prevent movement of the locking collar relative to the shaft.

Second press 105 is illustrated as comprising a plate 106 that is of substantially the same width as the portion of mold tray 80 which comprises forming regions 87. Plate 106 comprises a substantially planar working surface 108 which is substantially parallel to the top surface 86 of mold tray 80. Second press 105 is connected to reciprocation mechanism 135 of dough stamper 150.

In operation, dough dispenser 30 dispenses bread dough blanks 25 of desired shape and substantially uniform thickness in a known manner onto conveyor belt 41, which moves continuously so as to advance the bread dough blanks form left to right, as illustrated in FIG. 1. Conveyor belt 41 first advances bread dough blanks 25 underneath and in contact with dough roller 140, which serves to flatten the bread dough blanks further toward a desired, predetermined, substantially uniform thickness. Dough roller 140 is geared or otherwise keyed to conveyor belt 41, by conventional means, so that the tangential speed of the dough roller is substantially the same as the linear speed of the conveyor belt. It is contemplated that dough dispenser 30 may be configured to dispense bread or other dough blanks of any variety of other shapes, as well. As shown in FIG. 2, dough dispenser 30 may be further configured to simultaneously dispense a plurality of bread dough blanks 25 in a substantially linear fashion across the width of dough conveyor 40.

Dough conveyor 40 then advances the flattened bread dough blanks 25 underneath and beyond first flour duster 50 which dusts the bread dough blanks with flour to help prevent the bread dough blanks from sticking to other parts of the mechanism.

Figure 3:
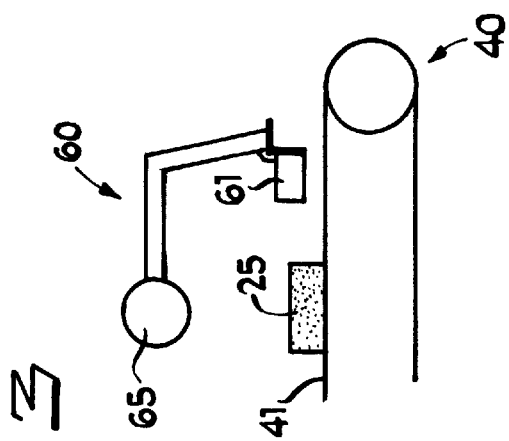
FIG. 3 is a side elevation view an arrangement tool in a first position relative to a dough conveyor.
Figure 4:
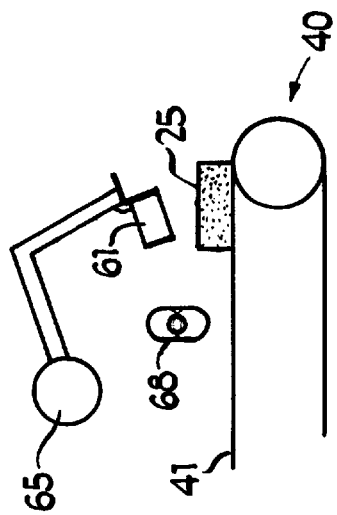
FIG. 4 is a side elevation view an arrangement tool in a second position relative to a dough conveyor.

Next, dough conveyor 40 advances the bread dough blanks towards proximity sensor 68 and arrangement tool 60. When proximity sensor 68 detects the presence of bread dough blanks 25 passing by the sensor on conveyor belt 41, the proximity sensor signals the control unit, which in turn signals toggling mechanism 66 to toggle arrangement tool from a first position, as illustrated in FIG. 4, to a second position, as illustrated in FIG. 3.

In the first position, arrangement tool 60 is oriented such that arrangement members 61 and all other portions of the arrangement tool are retracted from conveyor belt 41 by a distance which is great enough to allow conveyor belt 41 to advance bread dough blanks 25 underneath the arrangement tool, unimpeded. In the second position, arrangement tool 60 is oriented such that arrangement members 61 are in close proximity with, but typically not in contact with, conveyor belt 41.

With arrangement tool 60 in the second position, and conveyor belt 41 in continuous motion, bread dough blanks 25 are forced into arrangement members 61 so as to become aligned upon the conveyor belt in a predetermined manner. After a predetermined time has elapsed, the control unit for toggling mechanism 66 signals the toggling mechanism to return arrangement tool 60 to the first position, so that bread dough blanks 25 may be permitted to advance along dough conveyor 40, towards the end of the conveyor.

Dough conveyor 40 is operably associated with tray conveyor 70, and arrangement tool 60 is operably associated with forming regions 87 of mold trays 80. When conveyor belt 41 has advanced bread dough blanks 25 to the end of dough conveyor 40, the bread dough blanks will fall onto the forming regions 87 of a mold tray 80 which is positioned in a desired, predetermined orientation relative to the falling bread dough blanks.

In a preferred embodiment, bread dough blanks 25 fall from the conveyor belt 41 onto a forming region 87 in an orientation wherein the bread dough blanks partially overlie substantially circular depression 130 and partially overlie each of substantially oblong depressions 131 through 134. Consequently, the bread dough blanks 25 also overlie the portion of the top surface 81 of mold tray 80 which is adjacent to and/or between substantially circular depression 130 and substantially oblong depressions 131 through 134.

As bread dough blanks fall from conveyor belt 41 onto mold tray 80, proximity sensor 69 detects the presence of the falling bread dough blanks and sends a signal to the tray conveyor control unit. The control unit, in turn, sends a signal to the tray conveyor drive mechanism, signaling it to start. Tray conveyor 70 then advances mold trays 80 holding bread dough blanks 25 from left to right, as illustrated in FIG. 1.

As tray conveyor 70 begins to move, cam shaft 149, which is indexed to the tray conveyor, as described hereinabove, begins to rotate, in turn causing cam wheels 147 and 148 to rotate, at a rate which is proportional to the rate of translation of the tray conveyor and mold trays 80. After tray conveyor 70 has advanced mold tray through a predetermined distance, in turn rotating first cam wheel 147 through a predetermined arc, trigger 147*a* on first cam wheel 147 temporarily engages and trips first proximity switch 145. First proximity switch 145 then transmits a signal to the control unit for dough stamper 150, causing the dough stamper to begin an actuation cycle, which will be described in greater detail hereinafter.

After tray conveyor has advanced mold tray 80 an additional predetermined distance, in turn rotating cam shaft 149 and second cam wheel 148 through a predetermined arc, trigger 148*a* on second cam wheel 148 temporarily engages second proximity switch 146. Second proximity switch 146 then transmits a signal to the tray conveyor control unit, which in turn signals the tray conveyor drive mechanism to stop. Second proximity switch 146 is configured so as to stop tray conveyor 70 such that the next mold tray 80 on tray conveyor 70 is properly aligned in operable association with dough conveyor 40, such that the next wave of bread dough blanks 25 may fall onto the forming regions 87 of the now-aligned mold tray 80. This process is contemplated to continue so long as dough conveyor 41 continues to advance bread dough blanks 25 to tray conveyor 70.

As tray conveyor 70 moves mold tray 80 holding bread dough blanks 25 from left to right, the mold tray and bread dough blanks first pass underneath second flour duster 55, which dusts the exposed surfaces of the bread dough blanks and mold tray 80 with flour so as to minimize the blanks' tendency to stick to other parts of the apparatus.

Next, tray conveyor 70 advances mold tray 80 holding bread dough rolls 25 towards operable association with first press 90 of dough stamper 150. First press 90 is operably associated with reciprocation mechanism 135. As described hereinabove, as mold tray 80 advances to a desired, predetermined position relative to first press 90, accordingly rotating cam shaft 149 and first and second cam wheels 147 and 148, respectively, through a predetermined arc, trigger 147a on first cam wheel 147 trips first proximity switch 145, which signals the control unit for dough stamper 150 to actuate reciprocation mechanism 135. Reciprocation mechanism 135 causes first press 90 to impact bread dough blank 25 in a desired, predetermined manner, so that bread dough blank 25 is divided and spread across the top surface 86 and into depressions 130 through 134 of mold tray 80. After reciprocation mechanism 135 has traveled through an entire reciprocation cycle, that is, has caused first press 90 (and second press 150, as will be described hereinafter) to move from a position distant mold tray 80 and bread dough blank 25 to impact the bread dough blank and then return to an initial position distant the mold tray, the reciprocation mechanism control unit causes the reciprocation mechanism to stop automatically.

In a preferred embodiment, working surface 94 of press 91 is operably associated with forming regions 87 of mold trays 80, such that raised relief 95 on the working surface comes into proximity with the top surface of the forming region. Arcuate element 96 comes into proximity with forming region 87 between depression 130 and depressions 133 through 134; linear element 97 comes into proximity with forming region 87 so as to bisect depressions 131 and 132; linear element 98 comes into proximity with forming region 87 so as to bisect depressions 132 and 133; and linear element 99 comes into proximity with forming region 87 so as to bisect depressions 133 and 134 when press 91 is actuated by the reciprocation means. When raised relief 95 is pressed into proximity with forming region 87, it tends to separate or divide the bread dough blank into five regions corresponding to the five depressions 130 through 134, and the non-raised portion of the work surface 94 tends to force the bread dough blank into the five depressions. Since the press shafts 93 are resiliently mounted, the danger of damage to the presses or the mold trays due to over-extension of the presses is minimized.

After dough stamper 150 completes its actuation cycle, tray conveyor 70 stops in an orientation in which another mold tray 80 is aligned to receive a subsequent wave of bread dough blanks from dough conveyor 40. As bread dough blanks 25 fall from dough conveyor 40 onto a subsequent mold tray 80, proximity sensor is tripped, causing tray conveyor 70 to move, and causing camshaft 149 and cam wheels 147 and 148 to rotate, as described hereinabove. Trigger 147a of first cam wheel 147 will eventually trip first proximity switch 145, causing dough stamper 150 to actuate. The particular mold tray 80, holding bread dough blank 25, which had been impacted by first press 90 in the preceding step, will now have been advanced to a predetermined position wherein the mold tray is in operable association with second press 105. As dough stamper 150 goes through its actuation cycle, second press 105 impacts the bread dough blank 25 previously impacted by first press 90, forcing it more completely into depressions 130 through 134 of forming region 87 of mold tray 80.

As bread dough blanks 25 continue to fall from dough conveyor 40 onto subsequent mold trays 80, each time tripping proximity sensor 69, tray conveyor will eventually advance the mold trays towards the right end of tray conveyor, as illustrated in FIG. 1. Eventually, mold tray 80 will become inverted, as illustrated in FIG. 1, causing the now-shaped bread dough blank 25 to fall from the mold tray and onto another surface, such as conveyor 110, for further processing, such as baking in a conventional oven.

Although the present invention is described with respect to the manufacture of bread rolls from bread dough, it is to be understood that the principles of the present invention may be adapted to other dough products, without departing from the principles of the present invention.

The foregoing description and drawings merely explain and illustrate the invention and the invention is not limited thereto except insofar as the appended claims are so limited, as those skilled in the art having the disclosure before them will be able to make modifications and variations therein without departing from the scope of the invention.

I claim:

1. An apparatus for molding pre-formed bread dough blanks of substantially uniform thickness into formed dough bodies having a predetermined shape, the apparatus comprising:

a mold comprising at least a top surface, the top surface being configured to define at least two depressions;

means for placing a pre-formed dough blank onto the mold in a predetermined orientation relative to the at least two depressions;

a first press for spreading the dough blank across the top surface of the mold and forcing a portion of the dough blank at least partially into the at least two depressions;

first means for advancing the mold from the placing means to a first predetermined position wherein the mold and the dough blank are operably associated with the first press;

a second press for further spreading the dough blank across the top surface of the mold and forcing a portion of the dough blank completely into the at least two depressions;

second means for advancing the mold from the first predetermined position wherein the mold and dough blank are operably associated with the first press to a second predetermined position wherein the mold and the dough blank are operably associated with the second press; and means for releasing the dough blank from the mold.

2. The apparatus according to claim 1 wherein the mold comprises a top surface configured to define a substantially circular depression and four substantially oblong depressions.

3. The apparatus according to claim 2 wherein the four substantially oblong depressions is substantially symmetrically arranged about a portion of the perimeter of the substantially circular depression.

4. The apparatus according to claim 1 further comprising means for automatically actuating the means for placing a pre-formed dough blank onto the mold in a predetermined orientation relative to the at least two depressions.

5. The apparatus according to claim 1 wherein the predetermined orientation of a dough blank dropped onto the mold, relative to the at least two depressions is operably configured such that the dropped dough blank overlies a portion of the at least two depressions and a portion of the top surface of the mold between the at least two depressions.

6. The apparatus according to claim 1 wherein the first press is configured to divide the dough into at least two regions, the at least two regions corresponding to the at least two depressions, upon impacting the dough blank.

7. The apparatus according to claim 1 further comprising means for automatically actuating the first press and means for automatically actuating the second press.

8. The apparatus according to claim 1 wherein the first means for advancing the mold and the second means for advancing the mold comprise a conveyor system.

9. The apparatus according to claim 8 further comprising means for automatically actuating the conveyor system.

10. The apparatus according to claim 1 wherein the means for releasing the dough blank from the mold comprises means for tipping the mold towards an inverted position.

11. The apparatus according to claim 10 wherein the means for tipping the mold towards an inverted position is a conveyor system.

12. The apparatus according to claim 11 further comprising means for automatically actuating the conveyor system.

13. A process for forming pre-formed dough blanks of substantially uniform thickness into formed dough bodies having a predetermined shape, the process comprising the steps of:

provided a mold comprising a top surface configured to define at least two depressions;

placing a pre-formed dough blank onto the mold in a predetermined orientation relative to the at least two depressions;

advancing the mold to a first position wherein the mold and the dough blank are in a first predetermined orientation relative to a first press;

actuating the first press to impact the dough blank so as to spread the dough blank across the top surface of the mold and force the dough blank at least partially into the at least two depressions;

advancing the mold to a second position wherein the mold and the dough blank are in a second predetermined orientation relative to a second press;

actuating the second press to impact the dough blank so as to further spread the dough blank across the top surface of the mold and force the dough blank completely into the at least two depressions; and releasing the formed dough blank from the mold.

14. The process according to claim 13 wherein the mold comprises a top surface configured to define a substantially circular depression and four substantially oblong depressions.

15. The process according to claim 14 wherein the four substantially oblong depressions are substantially symmetrically arranged about a portion of the perimeter of the substantially circular depression.

16. The process according to claim 13 further comprising placing a pre-formed dough blank onto the mold such that the dough blank overlies a portion of the at least two depressions and a portion of the top surface of the mold between the at least two depressions.

17. The process according to claim 13 wherein the first press is configured to divide the dough blank into at least two regions corresponding to the at least two depressions, upon impacting the dough blank.

18. The process according to claim 13 wherein the steps of advancing the mold are carried out by automated means.

19. The process according to claim 13 wherein the steps of actuating the first and second presses are carried out by automated means.

20. The process according to claim 13 further comprising tipping the mold towards an inverted position to release the formed dough blank from the mold.

21. The process according to claim 20 wherein tipping the mold is carried out by automated means.

* * * * *

UNITED STATES PATENT AND TRADEMARK OFFICE
CERTIFICATE OF CORRECTION

PATENT NO.  : 5,976,599
DATED       : November 2, 1999
INVENTOR(S) : Biernacki

It is certified that error appears in the above-indentified patent and that said Letters Patent is hereby corrected as shown below:

Col. 4, line 7          delete space after "61", making reference number --61a--

Signed and Sealed this

Tenth Day of April, 2001

Attest:

NICHOLAS P. GODICI

*Attesting Officer*          *Acting Director of the United States Patent and Trademark Office*